US008192676B2

(12) United States Patent
Share et al.

(10) Patent No.: US 8,192,676 B2
(45) Date of Patent: Jun. 5, 2012

(54) CONTAINER HAVING BARRIER PROPERTIES AND METHOD OF MANUFACTURING THE SAME

(75) Inventors: Paul E. Share, Wexford, PA (US); Keith Pillage, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 267 days.

(21) Appl. No.: 10/777,299

(22) Filed: Feb. 12, 2004

(65) Prior Publication Data

US 2005/0181155 A1 Aug. 18, 2005

(51) Int. Cl.
*B29C 49/04* (2006.01)
*B29C 49/06* (2006.01)
*B29C 49/22* (2006.01)

(52) U.S. Cl. ........ 264/537; 264/513; 264/514; 264/539; 264/540

(58) Field of Classification Search .................. 264/537
See application file for complete search history.

(56) References Cited

U.S. PATENT DOCUMENTS

| | | | |
|---|---|---|---|
| 4,284,671 A | 8/1981 | Cancio et al. | |
| 4,501,781 A | 2/1985 | Kushida et al. | |
| 4,551,132 A | 11/1985 | Pasztor et al. | |
| 4,764,403 A | 8/1988 | Ajmera | |
| 4,795,741 A | 1/1989 | Leshchiner et al. | |
| 4,819,637 A | 4/1989 | Dormandy, Jr. et al. | |
| 4,837,115 A | 6/1989 | Igarashi et al. | |
| 4,994,069 A | 2/1991 | Ritchart et al. | |
| 5,001,009 A | 3/1991 | Whitbourne | |
| 5,021,515 A | 6/1991 | Cochran et al. | |
| 5,034,252 A * | 7/1991 | Nilsson et al. ................ | 428/35.8 |
| 5,049,624 A | 9/1991 | Adams et al. | |
| 5,108,407 A | 4/1992 | Giremia et al. | |
| 5,133,731 A | 7/1992 | Butler et al. | |
| 5,159,005 A | 10/1992 | Frandsen et al. | |
| 5,167,624 A | 12/1992 | Butler et al. | |
| 5,194,478 A | 3/1993 | Frandsen et al. | |
| 5,211,875 A * | 5/1993 | Speer et al. .............. | 252/188.28 |
| 5,226,911 A | 7/1993 | Chee et al. | |
| 5,239,016 A | 8/1993 | Cochran et al. | |
| 5,258,233 A | 11/1993 | Mills et al. | |
| 5,281,360 A | 1/1994 | Hong et al. | |
| 5,302,430 A | 4/1994 | Ardechir et al. | |
| 5,312,415 A | 5/1994 | Palermo | |
| 5,314,987 A | 5/1994 | Kim et al. | |
| 5,331,027 A | 7/1994 | Whitbourne | |
| 5,350,397 A | 9/1994 | Palermo et al. | |
| 5,382,259 A | 1/1995 | Phelps et al. | |
| 5,382,260 A | 1/1995 | Dormandy, Jr. et al. | |
| 5,476,472 A | 12/1995 | Dormandy, Jr. et al. | |
| 5,525,334 A | 6/1996 | Ito et al. | |
| 5,578,074 A | 11/1996 | Mirigian | |
| 5,580,568 A | 12/1996 | Greff et al. | |
| 5,582,619 A | 12/1996 | Ken | |
| 5,596,069 A | 1/1997 | Goodley | |
| 5,609,608 A | 3/1997 | Benett et al. | |
| 5,624,461 A | 4/1997 | Mariant | |
| 5,639,815 A | 6/1997 | Cochran et al. | |
| 5,641,825 A | 6/1997 | Bacskai et al. | |
| 5,645,558 A | 7/1997 | Horton | |
| 5,658,308 A | 8/1997 | Snyder | |
| 5,718,711 A | 2/1998 | Berenstein et al. | |
| 5,744,056 A * | 4/1998 | Venkateshwaran et al. .................. | 252/188.28 |
| 5,750,585 A | 5/1998 | Park et al. | |
| 5,759,653 A * | 6/1998 | Collette et al. ............... | 428/35.9 |
| 5,814,062 A | 9/1998 | Sepetka et al. | |
| 5,823,198 A | 10/1998 | Jones et al. | |
| 5,866,649 A | 2/1999 | Hong et al. | |
| 5,891,130 A | 4/1999 | Palermo et al. | |
| 5,911,737 A | 6/1999 | Lee et al. | |
| 5,955,527 A | 9/1999 | Cochran et al. | |
| 5,965,653 A * | 10/1999 | Nishikawa et al. ........... | 524/424 |
| 6,015,424 A | 1/2000 | Rosenbluth et al. | |
| 6,048,338 A | 4/2000 | Larson et al. | |
| 6,056,759 A | 5/2000 | Fiedler | |
| 6,063,100 A | 5/2000 | Diaz et al. | |
| 6,068,644 A | 5/2000 | Lulo et al. | |
| 6,083,220 A | 7/2000 | Guglielmi et al. | |
| 6,102,932 A | 8/2000 | Kurz | |
| 6,117,142 A | 9/2000 | Goodson et al. | |
| 6,239,210 B1 | 5/2001 | Kim et al. | |
| 6,319,267 B1 | 11/2001 | Kurz | |
| 6,361,547 B1 | 3/2002 | Hieshima | |
| 6,440,098 B1 | 8/2002 | Luscher | |

(Continued)

FOREIGN PATENT DOCUMENTS

| | | |
|---|---|---|
| EP | 0 191 701 | 8/1986 |
| EP | 0 380 319 | 8/1990 |
| EP | 0 510 591 | 10/1992 |

(Continued)

OTHER PUBLICATIONS

Rosenthal, D. et al.; "Angioscope-assisted endovascular . . . " Cardiovascular Surgery; Jun. 1993 vol. 1 No. 3.
Rosenthal, D. et al.; "Endovascular infrainguinal in situ . . . " Journal pof Vascular Surgery; pp. 453-458.
International Search Report for PCT/US2005/000394, dated Sep. 5, 2005.

*Primary Examiner* — Monica A Huson

(57) ABSTRACT

A method of manufacturing a multilayer or a monolayer plastic container is disclosed. The container has a barrier layer manufactured from (i) a polyester resin, preferably an aromatic polyester resin such as a polyethylene terephthalate, (ii) a polyamide material, preferably an aromatic polyamide material, and (iii) an oxygen scavenging material, preferably a transition method. The present invention also provides containers having a multilayer or a monolayer body. In the preparation of the barrier layer. a preform first is prepared by an injection-molding process wherein a preblend containing a diluent polyester, polyamide material, and an oxygen scavenging material is added to a base polyester during the injection molding process. The preform then is expanded to form a container.

25 Claims, No Drawings

U.S. PATENT DOCUMENTS

| | | |
|---|---|---|
| 6,494,884 B2 | 12/2002 | Gifford, III et al. |
| 6,514,264 B1 | 2/2003 | Naglreiter |
| 6,544,225 B1 | 4/2003 | Lulo et al. |
| 6,554,849 B1 | 4/2003 | Jones et al. |
| 2002/0037377 A1* | 3/2002 | Schmidt et al. .............. 428/35.8 |

FOREIGN PATENT DOCUMENTS

| | | |
|---|---|---|
| EP | 0 941 703 | 9/1999 |
| EP | 0 941 704 | 9/1999 |
| EP | 1 010 396 | 6/2000 |
| EP | 1 167 447 | 1/2002 |
| WO | WO 95/11801 | 5/1995 |
| WO | WO 99/06097 | 2/1999 |
| WO | WO 00/21443 | 4/2000 |
| WO | WO 02/38673 | 5/2002 |

* cited by examiner

CONTAINER HAVING BARRIER PROPERTIES AND METHOD OF MANUFACTURING THE SAME

FIELD OF THE INVENTION

The present invention is directed to plastic containers and methods of manufacturing the same. More particularly, the present invention is directed to multilayer and monolayer containers having excellent barrier properties and having at least one layer manufactured from a polyester resin, a polyamide material, and an oxygen scavenging material.

BACKGROUND OF THE INVENTION

Many packaged products, particularly food and beverage products, are susceptible to deterioration due to oxygen and/or moisture absorption or loss through the wall of the package. Therefore, containers, either rigid, semirigid, flexible, lidded, collapsible, or a combination thereof, not only serve as a package for the product, but also help prevent the ingress of undesirable substances from the environment.

Atmospheric oxygen is one of the most reactive substances with products packaged in a container. Molecular oxygen ($O_2$) is reduced to various highly reactive intermediate species by the addition of one to four electrons. The carbon-carbon double bonds present in virtually all foods and beverages are particularly susceptible to reaction with these reactive intermediate species. The resulting oxidation products adversely affect the performance, odor, and/or flavor of the product.

"Oxygen sensitive" materials, including foods, beverages, and pharmaceutical products, have special packaging requirements including preventing the ingress of exterior oxygen into the package and/or scavenging of oxygen that is present inside the package. In some cases, particularly in the orange juice and brewing industries, oxygen is removed from the product by vacuum, inert gas sparging, or both. However, it is difficult and expensive to remove the last traces of oxygen by these methods.

Containers made exclusively of glass or metal provide an excellent barrier both to egress of substances from the container and to ingress of substances from the environment. In most instances, gas permeation through a glass or metal container is negligible. Containers made of polymers, in whole or in part, generally do not possess the shelf life or barrier properties of glass or metal containers. Therefore, despite the great advantages of polymers, deficiencies restrict their use in containers.

The advantages of polymers include good mechanical, thermal, and optical properties, and an adaptability of container fabrication techniques that provides homogeneous, laminated, and/or coated containers. A further advantage of containers made from polymers include a light weight, reduced breakability, and low manufacturing cost.

Because of these advantages, the packaging industry is progressively shifting to plastic containers. This trend relates both to beverage containers, including carbonated beverages, and to food containers. In all these applications, insufficient barrier properties of the plastic material, particularly an insufficient capacity to prevent the passage of gases, e.g., oxygen and carbon dioxide, and vaporized liquids, e.g., water vapor, results in a reduced shelf life for products packaged in the plastic containers.

A number of solutions to overcome problems associated with plastic containers have been proposed. However, the proposed solutions failed to meet the commercially established requirements of low cost, in combination with high barrier properties, such that containers prepared from a plastic material can be practically employed. Examples of proposed solutions include:

a) laminates wherein two or more layers of a polymeric material are used, and the polymeric material in each layer optionally possesses a beneficial barrier property, for example, gas penetration, light penetration, or moisture penetration;

b) constructions wherein a metal, such as aluminum, either is positioned between layers of polymeric materials or forms the inner surface of the container; and c) constructions wherein a layer of barrier material, other than a metal, is positioned between layers of a polymeric material or forms the inner surface of the container.

Other proposed solutions are those wherein plastic materials of different types are mixed, then molded to form containers. For example, it is known to manufacture containers of polymeric material containing a mixture of polyethylene terephthalate (PET) and polyamide. See, for example, e.g., U.S. Pat. Nos. 4,501,781; 4,837,115; 5,034,252; 5,258,233; 5,281,360; 5,641,825; and 5,759,653.

In particular, attempts to solve problems associated with polymeric, i.e., plastic, containers led to the widespread use of oxygen barriers and/or moisture barriers in packaging materials. Typical moisture barriers include polyethylene and polypropylene. Oxygen barriers include ethylene-vinyl alcohol copolymer (EVOH), polyvinyl alcohol (PVOH), nylon, and blends thereof. Vinylidene chloride/vinyl chloride copolymers and vinylidene chloride/methyl acrylate copolymers are used as both moisture and oxygen barriers.

It is difficult to manufacture commercially useful plastic containers solely from barrier materials because of their high cost, unstable structural properties, and other drawbacks. For example, EVOH has superior oxygen barrier properties, but suffers from moisture problems because of the plurality of hydroxyl groups on the polymer. Other barrier materials are sufficiently expensive such that containers manufactured solely from such materials is cost prohibitive. Accordingly, it became a common practice to manufacture multilayer structures whereby the amount of an expensive or sensitive barrier material is reduced to a thin layer, and an inexpensive polymer is positioned on one or both sides of the barrier layer as structural layers.

Although multilayer structures containing a barrier layer are less expensive and structurally stronger than a single layer of barrier material, such containers are more complicated to manufacture than single-layered containers. In addition, reducing the thickness of the barrier layer in a multilayer container often reduces the barrier properties of the container. Accordingly, in addition to multilayer containers having a barrier layer, there is a need in the art for a monolayer container having high barrier and structural properties, but without the high cost associated with a container prepared solely from a barrier material.

One material commonly used in packaging applications is polyethylene terephthalate resin, hereafter referred to as PET. PET has a number of advantageous properties for use in packaging applications, but PET does not possess the gas barrier properties that are required or desired in many applications. For example, although PET has good oxygen barrier properties for carbonated juices, PET has not been useful as a package material for other products, such as beer which rapidly loses flavor due to oxygen migration into the bottle, citrus products, tomato-based products, and aseptically packed meat. A packaging material with physical properties similar to PET is polyethylene naphthalate (PEN). PEN has barrier properties greater than PET, but PEN is considerably more expensive than PET.

Extremely impermeable polymers, such as copolymers of ethylene and vinyl alcohol, vinylidene chloride and vinyl chloride, and m-xylylenediamine and adipic acid (i.e., MXD6) exist. But because of practical or cost reasons, these copolymers typically are used as thin layers on or between PET layers or, in the case of MXD6, for blending with PET, in low weight percent amounts, to achieve an insignificant gas permeability. Also, using a xylylene group-containing polyamide resin with PET in amounts greater than 30% by weight causes the container to become a laminated foil structure thereby providing the possibility of exfoliation between the foil layers of the container.

From the foregoing, it is appreciated that the art requires an improved plastic, multilayered or monolayered container having excellent barrier properties for gases, such as oxygen and carbon dioxide. Products that can be satisfactorily packaged within such containers include, for example, beer (particularly lager beer), wine (particularly white wine), fruit juices, carbonated soft drinks, fruits, nuts, vegetables, meat products, baby foods, coffee, sauces, and dairy products. Multilayer and monolayer plastic containers having excellent barrier properties, and methods of preparing the same, are disclosed herein.

SUMMARY OF THE INVENTION

The present invention is directed to a method of preparing a multilayer or monolayer plastic container having excellent barrier properties. The container has at least one barrier layer comprising (i) a polyester, (ii) a polyamide material, and (iii) an oxygen scavenging material. The barrier layer of the multilayer container, or a monolayer container, is prepared using an injection molding or extrusion process wherein a preblend comprising a diluent polyester, a polyamide material, and an oxygen scavenging material is added to a base polyester during the injection-molding or extrusion process.

More particularly, the present invention is directed to a plastic, multilayer or monolayer container prepared by an injection-molding or extrusion process wherein the container comprises at least one barrier layer prepared from an aromatic polyester, an aromatic polyamide, and a transition metal oxygen scavenger. For monolayer containers, the barrier layer is the sole layer of the container. For a multilayer or monolayer container, the container is formed by expansion of a preform having a barrier layer. The preform is prepared by an injection-molding or extrusion process wherein the barrier layer is formed from a preblend admixed with a base polymer in a molding apparatus prior to injection molding or extrusion to form the preform.

Accordingly, one aspect of the present invention is to provide a preform having a barrier layer, the barrier layer is prepared by injection molding or extruding a base polyester having added thereto a preblend containing a diluent polyester, a polyamide material, and an oxygen scavenging material. Typically, the preblend is added to the base polyester in the molding apparatus in the form of pellets or granules prior to injection.

Another aspect of the present invention is to provide a preblend comprising (a) about 25% to about 75%, by weight, of a diluent polyester, (b) about 25% to about 75%, by weight, of a polyamide material, and (c) about 20 to about 2000 ppm of a transition metal oxygen scavenger. The preblend is introduced to, and admixed with, the base polyester prior to the injection step of an injection molding or extrusion process to form a barrier layer of a preform. The preform then is expanded to provide a multilayer or monolayer container. The diluent polyester and the base polyester can be the same or different, for example, a polyethylene terephthalate (PET), a polyethylene naphthalate (PEN), or a mixture thereof.

A preblend used in the present method exhibits excellent stability, i.e., has a greater stability after six months storage at 25° C. and 40% relative humidity than a blend containing only a polyamide material and an oxygen scavenger material under the identical storage conditions.

The preblend and base polyester are admixed in an amount of about 0.5% to about 20%, and preferably about 1% to about 15%, by weight, of the preblend and about 80% to about 99.5%, and preferably about 85% to about 99%, by weight, of the base polyester. More preferably, the preblend and base polyester are admixed in an amount of about 2% to about 12%, by weight, of the preblend and about 88% to about 98%, by weight, of the base polymer. Typically, the preblend and base polymer are admixed in sufficient amounts to provide a preform containing about 10 to about 80 ppm, and preferably about 20 to about 50 ppm, of the oxygen scavenging material.

Another aspect of the present invention is to provide a multilayer or monolayer container having a barrier layer prepared by the present method wherein oxygen barrier properties are activated after contact with water.

Another aspect of the present invention is to provide multilayer containers by expansion of a preform, said multilayer container comprising (a) a central barrier layer containing a diluent polyester, a polyamide material, and an oxygen-scavenging material prepared in accordance with the present method, and (b) inner and outer layers of a formable polymer.

Still another aspect of the present invention is to provide a method of manufacturing a monolayer plastic container by injection molding or extruding a base polyester comprising an aromatic polyester, having added thereto a preblend comprising a diluent polyester comprising an aromatic polyester, a polyamide, and a transition metal oxygen scavenging material. In preferred embodiments, the aromatic polyester of the base polyester and pre-blend, same or different, comprises PET, PEN, or a mixture thereof; the polyamide is an aromatic polyamide, for example, a xylylene polyamide; and the transition metal oxygen scavenger comprises a salt or a complex of iron, cobalt, nickel, ruthenium, rhodium, palladium, osmium, iridium, platinum, or mixtures thereof.

Yet another aspect of the present invention is to provide a monolayer container comprising a polyester, a polyamide material, and an oxygen scavenging material. The monolayer container has excellent structural strength and maintains a high barrier capacity during storage because activation of oxygen scavenging is initiated after filling of the container with an aqueous product. The container also exhibits excellent esthetic properties, especially with respect to clarity of the container.

These and other aspects of the present invention will become apparent from the following detailed description of the preferred embodiments.

DETAILED DESCRIPTION OF THE PREFERRED EMBODIMENTS

Containers for products such as beer and juice require sufficient barrier properties to maintain the integrity of the product. As previously discussed, plastic containers typically require additives to provide or enhance barrier properties. Often barrier properties are achieved by providing a multilayer container having a barrier layer. It would be desirable to provide improved multilayer containers, or monolayer containers having sufficient barrier properties to maintain the integrity of the packaged product.

There are several factors that affect the appearance and performance of polymer-based containers comprising at least one layer of a barrier material. These factors include the shear experienced by the barrier material during the molding process, the thermal history of the material during the drying and molding processes, and the exposure of the barrier material to air. Air exposure can degrade barrier materials by oxidative processes and by moisture contact. These variables can be addressed, for example, by altering screw design, resin drying, and feed configuration. The present invention provides improvements in the method of manufacturing a preform to minimize the degradative factors discussed above.

Several methods of manufacturing a barrier layer of a plastic container on single-stage or multistage injection-molding equipment are envisioned. These methods include:

(1) metering a polyamide material and an oxygen scavenging material into the injector screw together with a polyester, such as PET;

(2) compounding the polyamide material and oxygen scavenging material, then adding the resulting mixture into the injector screw, together with the polyester; and (3) compounding the polyamide material, oxygen scavenging material, and polyester, then using the resulting blend for injection molding.

Method (1) cannot be practiced reliably because it requires metering of 15 ppm or less, i.e., about 0.05% or less by weight, of the oxygen scavenging material into the injector screw then blending to provide a homogenous mixture. The disadvantage of method (2) is that the polyamide material/oxygen scavenging material blend is temperature, oxygen, and moisture sensitive, thus the blend typically undergoes significant degradation during preform manufacture resulting in an unacceptable haze and yellowing of the container. The disadvantage of method (3) is the requirement of storing large amounts of a blended material having a fixed barrier level, thus making the method economically unattractive.

The present method overcomes disadvantages associated with the prior methods, and provides a more facile method of manufacturing containers having improved barrier performance and appearance. The present method of preparing a preform yields multilayer or monolayer containers having excellent barrier properties, and that reduces degradation of oxygen barrier properties thereby providing a more esthetic container, e.g., having a container improved optical properties, such as a reduced haze.

An important feature of the present invention is the preparation of a preblend that is storage stable for at least six months at 25° C. and 40% relative humidity. Another important feature is the preparation of a container from a preform of the present invention wherein the oxygen scavenging capabilities of the barrier layer are not activated until the container is filled with an aqueous fluid. Accordingly, the container has a long shelf life prior to filling, and a longer oxygen barrier capability after filling with an aqueous fluid.

The present invention provides a method of manufacturing a plastic container having sufficient oxygen barrier properties to maintain the integrity of oxygen-sensitive products, such as beer, packaged in the containers. The container also has an excellent appearance. The container is prepared from a preform by methods well known in the art, and comprises at least one barrier layer comprising a polyester, a polyamide material, and an oxygen scavenging material.

The preform is prepared by an injection-molding or extrusion process. In particular, the barrier layer of the preform is prepared as follows. A preblend containing a diluent polyester, a polyamide material, and an oxygen scavenging material first is prepared. The preblend is added to, and admixed with, a base polyester in an injection screw, prior to the injection-molding or extrusion step.

In particular, the preblend comprises (a) about 25% to about 75%, by weight, of a diluent polyester, (b) about 25% to about 75%, by weight, of a polyamide material, and (c) about 20 to about 2000 ppm of an oxygen scavenging material. Components (a), (b), and (c) are intimately admixed, and, preferably, formed into pellets or granules for addition to the base polyester. It also is envisioned that a particulate, or powdered, preblend of (a), (b), and (c) can be added to the base polyester.

More particularly, the preblend contains about 25% to about 75%, and preferably about 30% to about 70%, by weight, of the diluent polyester. In more preferred embodiments, the preblend contains about 40% to about 60%, by weight, of the diluent polyester.

The diluent polyester is a condensation product of a dibasic acid and a glycol. Typically, the dibasic acid comprises an aromatic dibasic acid, or ester or anhydride thereof, such as isophthalic acid, terephthalic acid, naphthalene-1,4-dicarboxylic acid, naphthalene-2,6,-dicarboxylic acid, phthalic acid, phthalic anhydride, tetrahydrophthalic anhydride, trimellitic anhydride, diphenoxyethane-4,4'-dicarboxylic acid, diphenyl-4,4'-dicarboxylic acid, and mixtures thereof. The dibasic acid also can be an aliphatic dibasic acid or anhydride, such as adipic acid, sebacic acid, decane-1,10-dicarboxylic acid, fumaric acid, succinic anhydride, succinic acid, cyclohexanediacetic acid, glutaric acid, azeleic acid, and mixtures thereof. Other aromatic and aliphatic dibasic acids known to persons skilled in the art also can be used. Preferably, the dibasic acid comprises an aromatic dibasic acid, optionally further comprising up to about 20%, by weight of the dibasic acid component, of an aliphatic dibasic acid.

The glycol, or diol, component of the diluent polyester comprises ethylene glycol, propylene glycol, butane-1,4-diol, diethylene glycol, a polyethylene glycol, a polypropylene glycol, neopentyl glycol, a polytetramethylene glycol, 1,6-hexylene glycol, pentane-1,5-diol, 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(hydroxyethoxy)benzene, 2,2-bis-(4-hydroxycyclohexyl)propane, 2,4-dihydroxy-1,1,3,3-tetramethylcyclobutane, 2,2-bis-(3-hydroxyethoxyphenyl)propane, 2,2-bis-(4-hydroxypropoxyphenyl)propane, 1,4-dihydroxymethylcyclohexane, and mixtures thereof. Additional glycols known to persons skilled in the art also can be used as the glycol component of the diluent polyester.

Two preferred diluent polyesters are PET and PEN. The PET and PEN can be homopolymers, or copolymers further containing up to 10 mole percent of a dibasic acid different from terephthalic acid or a naphthalene dicarboxylic acid, and/or up to 10 mole percent of a glycol different from ethylene glycol.

As used herein, the term "PEN" refers to polyethylene naphthalene 2,6-dicarboxylate, polyethylene naphthalene 1,4-dicarboxylate, polyethylene naphthalene 1,6-dicarboxylate, polyethylene naphthalene 1,8-dicarboxylate, and polyethylene naphthalene 2,3-dicarboxylate. Preferably, PEN is polyethylene naphthalene 2,3-dicarboxylate.

In particular, the diluent polyester preferably comprises PET (e.g., virgin bottle grade PET or postconsumer PET (PC-PET)), cyclohexane dimethanol/PET copolymer (PETG), polyethylene naphthalate (PEN), polybutylene terephthalate (PBT), and mixtures thereof.

Suitable polyesters also can include polymer linkages, side chains, and end groups different from the formal precursors of the simple polyesters previously specified.

Suitable polyesters for use in the present invention typically have an intrinsic viscosity of about 0.6 to about 1.2, and more preferably about 0.7 to about 1.0 (for a 60/40 blend of phenol/tetrachloroethane solvent). For PET, an intrinsic viscosity value of 0.6 corresponds approximately to a viscosity average molecular weight of 36,000, and an intrinsic viscosity value of 1.2 corresponds approximately to a viscosity average molecular weight of 103,000.

The diluent polyester optionally can include additives that do not adversely affect the preblend, or preforms or containers prepared therefrom. The optional additives include, but are not limited to, stabilizers, e.g., antioxidants or ultraviolet light screening agents, extrusion aids, drying agents, fillers, anticlogging agents, crystallization aids, impact modifiers, additives designed to make the polymer more degradable or combustible, dyes, pigments, and mixtures thereof. The optional additives are present in the diluent polyester in an amount of 0% to about 2%, by weight of the diluent polyester, individually, and 0% to about 10%, by weight of the diluent polyester, in total.

In addition to the diluent polyester, the preblend contains about 25% to about 75%, and preferably about 30% to about 70%, by weight, of a polyamide material. In more preferred embodiments, the preblend contains about 40% to about 60%, by weight, of the polyamide material.

The polyamide material can be an aromatic polyamide or an aliphatic polyamide. The polyamide material also can be a homopolyamide material or a copolyamide material. An aromatic polyamide, either a homopolymer or a copolymer, is preferred.

A preferred class of polyamide materials is the MX nylons. MX nylons are polymers containing at least 70 mol % of structural units obtained from m-xylylenediamine alone or a xylylenediamine mixture containing m-xylylenediamine and p-xylylenediamine in an amount of less than 30% of the total amount and an $\alpha,\omega$-aliphatic dicarboxylic acid having 6-10 carbon atoms.

Examples of MX polymers include homopolymers, such as poly-m-xylylene adipamide and poly-m-xylylene sebacamide, copolymers, such as m-xylylene/p-xylylene adipamide copolymer, m-xylylene/p-xylylene pyperamide copolymer, and m-xylylene/p-xylylene azelamide copolymer, and copolymers of these homopolymer or copolymer components and aliphatic diamines such as hexamethylenediamine, cyclic diamines such as piperazine, aromatic diamines such as p-bis(2-aminoethyl)benzene, aromatic dicarboxylic acids such as terephthalic acid, lactams such as $\epsilon$-caprolactam, $\omega$-aminocarboxylic acids such as $\omega$-amino-heptoic acid, and aromatic aminocarboxylic acids such as p-aminobenzoic acid. Optionally, polymers such as nylon 6, nylon 66, nylon 610, and nylon 11 can be incorporated into the MX polymers.

An especially preferred aromatic polyamide is the polymer formed by the polymerization of meta-xylylenediamine (i.e., $H_2NCH_2$-m-$C_6H_4$—$CH_2NH_2$) and adipic acid (i.e., $HO_2C(CH_2)_4CO_2H$), for example, a product manufactured and sold by Mitsubishi Gas Chemicals, Japan, under the designation MXD6. Various grades of MXD6 are available, e.g., grades 6001, 6007, 6021. A preferred aliphatic polyamide material is nylon 66. Other suitable polyamides include, for example, GRIVORY® (e.g., GRIVORY® G16 and G21, which are copolyamides having both linear aliphatic units and ring-like aromatic components, available from EMS-Chemie Inc.) and VERSAMID® (an aliphatic polyamide typically used as an ink resin and available from Cognis Corporation).

In addition to the diluent polyester and polyamide material, the preblend contains an oxygen scavenging material. The oxygen scavenging material is present in an amount of about 20 to about 2000, and preferably about 50 to about 1500 ppm, by weight of the preblend. In more preferred embodiments, the preblend contains about 100 to about 1000 ppm of the oxygen scavenging material, by weight of the preblend.

An "oxygen scavenger" is any material or compound that can remove oxygen from the interior of a closed package, or prevent oxygen from entering the interior of the package, either by reacting or combining with the entrapped oxygen, or by promoting an oxidation reaction that yields innocuous products.

The oxygen scavenging material imparts high oxygen barrier properties, i.e., a substantial capacity to withstand the passage of oxygen, to the container. The effect responsible for the barrier properties capacity is referred to as the oxygen "scavenger"-effect. While not intended to be bound by any theory, it is proposed that oxygen scavenging materials form active metal complexes having a capacity to bond with oxygen. Thus, the oxygen scavenging material confers high oxygen barrier properties to the container.

A broad variety of metallic compounds are effective in providing the oxygen scavenging effect, and an appropriate oxygen scavenging material is selected based on cost and compatibility with the diluent polyester and polyamide material of the preblend. A preferred oxygen scavenging material is a metal, or a complex or salt of a metal, selected from the first, second, and third transition series of the periodic table. Such metals include iron, cobalt, copper, manganese, zinc, nickel, ruthenium, rhodium, palladium, osmium, iridium, and platinum. Suitable oxygen scavenging materials for use in the present invention also include aluminum powder, aluminum carbide, aluminum chloride, cobalt powder, cobalt oxide, cobalt chloride, antimony powder, antimony oxide, antimony triacetate, antimony chloride III, antimony chloride V, iron, electrolytic iron, iron oxide, platinum, platinum on alumina, palladium, palladium on alumina, ruthenium, rhodium, copper, copper oxide, nickel, and mixed metal nanoparticles (e.g., cobalt iron oxide nanoparticles). Suitable nanoparticles have an average particle size of less than about 200 nm, preferably less than about 100 nm, and more preferably about 5 to about 50 nm.

A cobalt, iron, nickel, copper, or manganese compound is the preferred oxygen scavenging material. A cobalt compound is most preferred. Typically, the oxygen scavenging material is present as a salt or a complex of a metal. The anion of the salt can be inorganic or organic. Examples of anions include halide, especially chloride, acetate, stearate, and octoate. Other oxygen scavenging agents include cobalt (II) bromide and cobalt carboxylate. Cobalt carboxylate is available as cobalt SICCATOL® (trademark of Akzo Chemie Nederland B.V., Amersford, Netherlands). A cobalt carboxylate is a solution of $C_8$-$C_{10}$ cobalt carboxylates and the concentration of cobalt (as metal) is about 10%, by weight, relative to the solution.

The relative amounts of the diluent polyester, polyamide material, and oxygen scavenging material in the preblend is related to variables such as the identity of the base polyester, the product to be packaged in the container, and the amount of the preblend added to the base polymer. The preblend can be in the form of pellets, granules, or a powder.

A general method of preparing one embodiment of a preblend of the present invention containing PET, MXD6, and a cobalt oxygen scavenging material on a twin screw extruder follows. In particular, the diluent polyester (PET) is dried in a fixed bed dessicant dryer, such as a dryer manufactured by Conair. Typical drying conditions for a PET are about four hours at about 160° C. The MXD6 either can be used as supplied in sealed foil bags from the manufacture, or can be dried either separately or in combination with the PET at about 140° C. A cobalt oxygen scavenging material can be in a liquid form or in a solid form. The cobalt catalyst can be preblended with one or both of the PET and MXD6 in a Henschel mixer (Henschel Industrietecknik GmBH, Kassel, Germany), or pumped separately in liquid form into a feed throat of an extruder. Preferably, the cobalt oxygen scavenging material is introduced concurrently with at least one of the PET and MXD6 in a first feed zone of the extruder.

The following Example 1 is a nonlimiting example of a preblend containing (a) 46%, by weight, of a PET, (b) 54%, by weight, MXD6, and (c) 500 ppm of cobalt oxygen scavenging material (as cobalt neodecanoate).

Example 1

MXD6 Grade 6007 (16.2 pounds), available from Mitsubishi Gas Corporation, was admixed with 13.8 pounds of PET Grade 9663, available from Voridian Chemical, and the resulting blend was dried for four hours at 140° C. To ten pounds of this mixture was added 2.27 g (500 ppm by weight) cobalt neodecanoate (i.e., 128 ppm based on cobalt ion) available from OM Group, Inc., Cleveland, Ohio. The mixture was blended by hand, then introduced into the feedthroat of a Werner and Pfleiderer ZSK-25 twin screw extruder equipped with a volumetric feeder. The heated zones of the extruder were maintained between 240° C. and 280° C. The extruded blend was stranded onto an air-cooled belt, then pelletized. The resulting pellets were recrystallized at 120° C. for four hours under vacuum.

As disclosed above, solid particles of the preblend are admixed with solid particles of a base polymer prior to the injection step of an injection-molding or extrusion process to provide a barrier layer of a preform. The preforms are converted into containers in subsequent process steps. In particular, the preblend particles are metered into, and admixed with, the base polyester particles in the injector screw, prior to the injection step.

The preblend is added to the base polymer in an amount of about 0.5% to about 20%, and preferably about 1% to about 15%, by weight, of the preblend/base polyester mixture. In more preferred embodiments, the preblend is present in an amount of about 2% to about 12%, by total weight of the preblend/base polyester mixture.

The base polyester can be the same as, or different from, the diluent polyester of the preblend. The base polymer can comprise a single polymer or a mixture of two or more polymers. Suitable base polymers include polyesters described above with respect to the identity of the diluent polymer. Like the preblend, the base polyester, or preblend/base polyester mixture, can contain optional ingredients known to persons skilled in the art.

The selection of a base polyester is not especially limited. However, a requirement is compatibility between the base polyester and the components of the preblend. Persons skilled in the art are capable of selecting the base polyester for use with a particular preblend. Furthermore, the components of the preblend can be selected with a view to the desired base polyester in order to provide a physically and chemically compatible preblend/base polymer mixture.

The proportion of the preblend to the base polymer also depends on various parameters, such as the identity of the components, and weight percents thereof, in the preblend, the identity of the base polyester, desired barrier effect, particular end use of the container, desired container shelf life, recyclability, economics, and ease of manufacture.

Numerous multilayer preform and container constructions exist, each of which is adapted for a particular product and/or manufacturing process. A few representative examples follow.

One three-layer construction comprises a barrier layer disposed between inner and outer layers. For example, a three-layer sidewall construction of a container can comprise inner and outer layers of a PET and a core barrier layer.

A five-layer structure can have relatively thin inner and outer intermediate layers to provide high oxygen barrier properties without loss of clarity. Relatively thicker inner and outer layers of PET provide the necessary strength and clarity. A thin barrier layer prepared as described above provides the necessary barrier effect.

In preferred embodiments, the barrier layer of a multilayer layer container has a thickness of about 1 and 10, more preferably between about 2 and 8, and most preferably between about 3 and 6 percent of the total container wall thickness.

Several different methods are practiced to prepare containers of the present invention.

In one method, a multilayered container is prepared by: (i) providing a mixture of a preblend and a base polyester as discussed above; (ii) providing an inner and outer layer material of a suitable formable polymer; (iii) coinjecting the preblend/base polyester mixture and the inner and outer layer materials to form a multilayered preform; and (iv) heating and expanding the preform to form a container.

In an alternative method, a multilayered container is prepared by: (i) providing a mixture of a preblend and a base polyester as discussed above; (ii) providing an inner and outer layer material of a suitable formable polymer; (iii) extruding a multilayer parison tube having inner and outer layers of a suitable formable polymer and a core layer of the preblend/base polyester mixture; (iv) clamping the parison tube into a hollow cavity mold; (v) blowing the parison against the cavity; and (vi) trimming the molded container.

In yet an alternative method (the "over-injected parison" method), a multilayered container is prepared by: (i) providing a mixture of a preblend and a base polyester as discussed above; (ii) providing an inner and outer layer material of a suitable formable polymer; (iii) extruding a multilayer parison tube having inner and outer layers of a suitable formable polymer and a central barrier layer prepared from the preblend/base polyester mixture; (iv) injecting one or more additional layers of polymer over the parison; (v) clamping the over-injected parison tube into a hollow cavity mold; (vi) blowing the over-injected parison against the cavity; and (vii) optionally trimming the molded container.

In yet another method (called "IOI"), a multilayered container is prepared by: (i) providing a mixture of a preblend and a base polyester as discussed above; (ii) providing a suitable formable polymer; (iii) injecting the preblend/base polyester mixture to form a preform; (iv) injecting a layer of formable polymer against the preform (e.g., on the outside surface); and (v) heating and expanding the preform to form a container.

In accordance with the present invention, to form a monolayer container, a preform is manufactured by an injection-molding or extrusion process using the preblend and the base polyester. The preform then is converted to a container using processes known to persons skilled in the art. In the present injection-molding or extrusion process, the base polyester is introduced into the injector screw. Either at the feed throat or at an appropriate position along the length of the injector screw, a preblend is added to the base copolyester. The preblend is added to the base polyester at a point to permit sufficient admixing of the molten base polyester and the molten preblend to provide a homogeneous admixture. The base polyester/preblend mixture then is injected or extruded to form a preform. The preform then is heated and expanded, for example, to form a monolayer container.

In general, in the preparation of a monolayer container or the barrier layer of a multilayer container, a base polyester/preblend mixture is fed, without exposure to the ambient atmosphere, into a molding apparatus where, in accordance with conventional techniques, the mixture is melted and a preform is injection molded or extruded from the molten blend. For injection molding, the base polyester/preblend mixture is held in the compression section of the injection-molding apparatus at a temperature of about 255° C. to about 280° C., preferably about 260° C. to about 275° C., and also in the injection nozzle generally within the same temperature range. The preform is cooled rapidly in order to remain amorphous.

The amorphous preform subsequently is reshaped into a container. In certain physical applications, reshaping is effected wherein a preform of amorphous material is expanded in the axial direction and/or in its circumferential direction into an intermediate preform that is thinner than the preform, and preferably is at least a monoaxially oriented material. The intermediate preform subsequently is subjected to further expansion into the final shape of the container. In other physical applications, the preform is converted into the container in a single forming stage. The present method of manufacturing a monolayer container also permits the use of post consumer PET, which substantially reduced production costs.

The following nonlimiting examples illustrate the present invention and are not to be construed as limiting the scope thereof.

Example 2

Carbonated soft drink bottles were manufactured from a base polyester and a preblend containing 46%, by weight, diluent polyester; 54%, by weight, polyamide material; and 500 ppm cobalt ion, as cobalt neodecanoate.

As set forth in the table below, a preblend was added to the base polyester in an amount of about 4%, by weight, of the total mixture. The containers prepared from the resulting mixture were tested for barrier and esthetic properties. Carbonated soft drink bottles used in this example were prepared in general as follows:

A preblend, such as Example 1, was dried in a Conair dryer for 3 hours at 140° C. to a maximum moisture content of 50 ppm. The dried preblend was charged into a volumetric feeder (available commercially from Maguire Products, Aston, Pa.) mounted on the feedthroat of a Husky injection-molding machine. The hopper of the volumetric feeder was fitted with a nitrogen gas purge to ensure that the dried preblend was maintained free of moisture and oxygen during processing. Delivery of the volumetric feeder was synchronized electronically with the delivery of the PET into the feedthroat of the injection screw. The feeder was calibrated to deliver a predetermined amount of the preblend with each cycle, typically corresponding to about 1 to about 10 weight percent of the total composition. Preforms containing the preblend and base polymer then were produced in the same manner as preforms containing only PET, as is known in the art. The preforms then were blowmolded according to methods well known in the art to provide a soft drink bottle, or, after blow-molding, were subjected to an optional heat set step to provide hot-filled juice bottles.

Various containers were prepared by the above method from different preblends and different base polymers, then tested for barrier properties and haze as summarized in Table 1.

TABLE 1

| Container No. | % Preblend | Unfilled | Cold Filled | % Haze[1] |
| --- | --- | --- | --- | --- |
| 1 | 4 | 0.0198 | 0.0137 | 0.34/0.10 |
| 2 | 4 | 0.0026 | <0.0025 | 0.07/0.16 |
| 3 | 4 | 0.0246 | <0.0025 | 0.07/0.07 |
| 4 | 4 | 0.0219 | 0.0043 | 0.03/0.10 |
| 5 | 4 | 0.0110 | <0.0025 | 0.06/0.04 |
| 6 | 4 | 0.1183 | 0.0345 | 2.71/1.41 |
| 7 | 4 | 0.0213 | 0.0028 | 0.20/0.45 |

[1] two replicate tests.

Containers 1-7 were prepared from the following components. Each preblend contained 46 wt % of a PET, 54 wt % of an MXD6, and 500 ppm of cobalt neodecanoate. The PET of the preblend and the base PET are identical for each container. All containers were prepared using 4 wt % of the preblend, which provides 20 ppm, respectively, of cobalt ion (as cobalt neodecanoate, available from Eastman Chemicals).

Container 1—a high molecular weight PET (i.e., TRAY-TUF 8506, available from M&G Polymer USA, LLC, Houston, Tex.), MXD6 (Grade 6121 available from Mitsubishi Gas Corporation);

Container 2—TRAYTUF 8506 PET, MXD6 (Grade 6007);

Container 3—Eastman 9663 PET, available from Eastman Chemical, MXD6 (Grade 6007);

Container 4—Eastman 9663 PET, MXD6 (Grade 6007);

Container 5—TRAYTUF 8506 PET, MXD6 (Grade 6007);

Container 6—Eastman 9663 PET, MXD6 (Grade 6121); and

Container 7—TRAYTUF 8506 PET, MXD6 (Grade 6121). The different PET components had essentially the same intrinsic viscosity. The different MXD6 components varied in molecular weight and viscosity.

The data in Table 1 summarizes oxygen permeability for unfilled containers and containers cold filled with water for 48 hours. Oxygen transmission measurements were performed on a Mocon Oxtran 2/20 Model ML and SM that was adapted for use with 10 oz. (295 ml) bottles at ambient temperature and humidity. The containers were conditioned for 24 to 48 hours prior to each measurement. The test provided Mocon data for a 120-hour examination time and illustrates oxygen permeability in cc $O_2$/package/day. Table 1 also contains data from a haze test performed using a Hunter Laboratories Color-quest apparatus.

The data in Table 1 shows that containers prepared from preforms manufactured in accordance with the present method provided excellent oxygen barrier properties, especially in the cold filled containers wherein the cobalt/MXD6 barrier system has been activated. The % haze values show that the containers also exhibit an excellent appearance in addition to high barrier properties.

In particular, the unfilled containers exhibited an oxygen permeability greater than cold filled containers, e.g., about 10 times greater. This illustrates that the oxygen barrier properties of containers manufactured in accordance with the present invention are initiated after the container is filled. This is an important aspect of the present invention because, after activation, oxygen barrier properties degrade over time. By initiating oxygen barrier properties after filling, as opposed to during unfilled storage, a product packaged in the container is protected for a longer period of time.

The present method overcomes problems associated with prior methods of manufacturing containers comprising a polyester, a polyamide material, and an oxygen scavenging material. First, the preblend is stable over a prolonged time period prior to forming the preform. The presence of a diluent polyester prevents or retards activation of the oxygen barrier complex, and allows storage of the preblend for several months prior to manufacture of a preform. This feature is a significant economic benefit to container manufacturers. Second, because oxygen barrier properties are not activated until a container is filled, the present method allows the manufacture of a container having excellent barrier and esthetic properties long after the container has been made.

The present method also permits a homogeneous distribution of the oxygen scavenging material throughout the polyester, reduces degradation of the oxygen barrier effect because of a premature contact and activation of the polyamide-oxygen scavenging metal complex, increases thermal stability of the PET/preblend mixture resulting in improved stability, and is facile and economically attractive. Importantly, the preparation of the preblend minimizes or eliminates contact between the polyamide material and the oxygen scavenging material prior to incorporation into the base polyester. This in turn eliminates premature activation of the oxygen scavenging complex, i.e., premature oxidation, which reduces the oxygen barrier properties of the monolayer container.

Containers manufactured using the present method exhibited permeability coefficients for oxygen of between 0.1 and 0.01. Thus, these containers are especially well suited as a package for products wherein high oxygen barrier properties are required.

A multilayer or a monolayer container of the present invention provides excellent oxygen barrier properties and esthetic properties for packaging products such as carbonated soft drinks. A present container is particularly useful in packaging products such as beer, citrus products, tomato-based products, and aseptically packaged meat, because such products rapidly lose flavor due to oxygen migration into the bottle.

Obviously, many modifications and variations of the invention as hereinbefore set forth can be made without departing from the spirit and scope thereof and, therefore, only such limitations should be imposed as are indicated by the appended claims.

What is claimed is:

1. A method, comprising:
   (a) forming a preblend comprising:
      (i) a diluent polyester,
      (ii) a polyamide material, wherein the polyamide material comprises a polymer containing m-xylylenediamine monomer units, p-xylylenediamine monomer units, or a mixture thereof, and
      (iii) cobalt or a complex or salt thereof present in the preblend in an amount of 20 to 2,000 parts per million, by weight;
   (b) providing a base polyester;
   (c) introducing the preblend of step (a) and the base polyester of step (b) into a molding apparatus to permit melting and admixing of the preblend and the base polyester;
   (d) injection molding or extruding the admixture of step (c) in the apparatus to provide a preform; and
   (e) expanding the preform of step (d) to provide a plastic container having a barrier layer formed from the admixture of step (c);
   (f) wherein the plastic container is stable during unfilled storage and the barrier layer has an oxygen scavenging property that is activated after filling the container with an aqueous fluid, and wherein activation results from filling.

2. The method of claim 1 wherein the plastic container is a multilayer plastic container.

3. The method of claim 1 wherein the plastic container is a monolayer plastic container.

4. The method of claim 1 wherein the preblend of step (a) has a greater stability after storage for six months at 25° C. and 40% relative humidity than a blend containing only a polyamide material and an oxygen scavenging material stored under identical storage conditions.

5. The method of claim 1 wherein the preblend is in a form of solid particles.

6. The method of claim 1 wherein the diluent polyester is present in the preblend in an amount of about 25% to about 75%, by weight of the preblend.

7. The method of claim 1 wherein the diluent polyester comprises a homopolymer or a copolymer of a polyethylene terephthalate, a polyethylene naphthalate, a polybutylene terephthalate, a cyclohexane dimethanol/polyethylene terephthalate copolymer, or a mixture thereof.

8. The method of claim 6 wherein the base polyester is a virgin bottle grade polyester and the admixture of step (c) consists essentially of the base polyester and the preblend.

9. The method of claim 1 wherein the polyamide material is present in the preblend in an amount of about 25% to about 75%, by weight of the preblend.

10. The method of claim 1 wherein the polyamide material comprises a polymerization product of m-xylenediamine and adipic acid.

11. The method of claim 1 wherein the preblend comprises about 30% to about 70%, by weight, of the diluent polyester comprising a polyethylene terephalate, a polyethylene naphthalate, or a mixture thereof; about 30% to about 70%, by weight, of the polyamide material; and about 50 to about 1500 ppm, by weight, of a salt or a complex of cobalt.

12. The method of claim 1 wherein the base polyester is in a form of solid particles.

13. The method of claim 8 wherein the preblend and the base polyester are admixed in an amount of about 0.5% to about 20%, by weight, of the preblend, and about 80% to about 99.5%, by weight, of the base polyester.

14. The method of claim 8 wherein the base polyester is selected from the group consisting of a polyethylene terephthalate, a polynaphthalene terephthalate, a polybutylene terephthalate, a cyclohexane dimethanol/polyethylene terephthalate copolymer, or a mixture thereof.

15. The method of claim 1 wherein the base polyester comprises a virgin bottle grade polyethylene terephthalate, a post consumer grade polyethylene terephthalate, or a mixture thereof.

16. The method of claim 1 wherein the preform contains about 10 to about 80 ppm, by weight, of cobalt or a salt or complex thereof.

17. The method of claim 1, further comprising:
   activating the oxygen scavenging property of the barrier layer by filling the plastic container with the aqueous fluid.

18. The method of claim 1, wherein the plastic container has an oxygen permeability of 0.035 cc $O_2$/package/day or less after filling with water for 48 hours.

19. The method of claim 8, wherein the preblend comprises:
about 30% to about 70%, by weight, of the diluent polyester;
about 30% to about 70%, by weight, of the polyamide material; and
about 50 to about 1500 ppm, by weight, of cobalt or a complex or salt thereof.

20. The method of claim 8, wherein the base polyester is a virgin bottle grade polyethylene terephthalate.

21. The method of claim 8, wherein the cobalt or a salt or complex thereof is present in the preblend in an amount of about 100 to about 1,000 parts per million, by weight of the preblend.

22. A method, comprising:
(a) forming a preblend comprising:
  (i) a diluent polyester,
  (ii) a polyamide material, wherein the polyamide material comprises a polymer containing m-xylylenediamine monomer units, p-xylylenediamine monomer units, or a mixture thereof, and
  (iii) cobalt or a complex or salt thereof;
(b) providing a base polyester consisting essentially of a virgin bottle grade polyester;
(c) introducing the preblend of step (a) and the base polyester of step (b) into a molding apparatus to permit melting and admixing of the preblend and the base polyester to form an admixture;
(d) injection molding or extruding the admixture of step (c) in the apparatus to provide a preform; and
(e) expanding the preform of step (d) to provide a plastic container having a barrier layer formed from the admixture of step (c);
(f) wherein the plastic container has an oxygen permeability in cc $O_2$/package/day after filling with water for 48 hours, that is less than the oxygen permeability of the container prior to filling with water, and wherein activation of oxygen-scavenging results from filling.

23. The method of claim 22, wherein the preblend comprises:
about 30% to about 70%, by weight, of the diluent polyester comprising a polyethylene terephthalate, a polyethylene naphthalate, or a mixture thereof;
about 30% to about 70%, by weight, of the polyamide material; and
about 50 to about 1500 ppm, by weight, of cobalt or a complex or a salt thereof.

24. A method, comprising:
filling a monolayer plastic container with an aqueous product to activate an oxygen scavenging property of the plastic container, wherein the container has been produced by a process comprising:
(a) forming a preblend comprising:
  (i) a diluent polyester,
  (ii) a polyamide material comprising a polymer containing m-xylylenediamine monomer units, p-xylylenediamine monomer units, or a mixture thereof, and
  (iii) cobalt or a complex or salt thereof;
(b) providing a base polyester;
(c) introducing the preblend of step (a) and the base polyester of step (b) into a molding apparatus to permit melting and admixing of the preblend and the base polyester;
(d) injection molding or extruding the admixture of step (c) in the apparatus to provide a monolayer preform; and
(e) expanding the monolayer preform of step (d) to provide a monolayer plastic container having a barrier layer formed from the admixture of step (c).

25. The method of claim 24, wherein the preblend comprises:
about 30% to about 70%, by weight, of the diluent polyester comprising a polyethylene terephthalate, a polyethylene naphthalate, or a mixture thereof;
about 30% to about 70%, by weight, of the polyamide material; and
about 50 to about 1500 ppm, by weight, of cobalt or a complex or a salt thereof.

* * * * *